(12) United States Patent
Li

(10) Patent No.: US 11,711,111 B2
(45) Date of Patent: Jul. 25, 2023

(54) SIGNAL TRANSCEIVING APPARATUS AND METHOD HAVING ECHO-CANCELING MECHANISM

(71) Applicant: REALTEK SEMICONDUCTOR CORPORATION, Hsinchu (TW)

(72) Inventor: Cheng-Hsien Li, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 69 days.

(21) Appl. No.: 17/358,402

(22) Filed: Jun. 25, 2021

(65) Prior Publication Data

US 2022/0200657 A1 Jun. 23, 2022

(30) Foreign Application Priority Data

Dec. 18, 2020 (TW) .................................. 109145103

(51) Int. Cl.
*H04B 3/21* (2006.01)
*H04B 1/04* (2006.01)
*H04B 3/23* (2006.01)

(52) U.S. Cl.
CPC ............. *H04B 3/21* (2013.01); *H04B 1/0475* (2013.01); *H04B 3/23* (2013.01)

(58) Field of Classification Search
CPC ........ H04B 1/0475; H04B 1/525; H04B 1/52; H04B 1/58; H04B 3/00; H04B 3/02;
(Continued)

(56) References Cited

U.S. PATENT DOCUMENTS 5,204,854 A 4/1993 Gregorian et al.
5,745,564 A 4/1998 Meek
(Continued)

FOREIGN PATENT DOCUMENTS

TW 201404053 A 1/2014

OTHER PUBLICATIONS

OA letter of the counterpart TW application(appl. No. 109145103) dated Jul. 30, 2021. Summary of the OA letter: Claims 1~10 are rejected as being unpatentable over the disclosure of the cited reference 1 (TW 201404053 A).

*Primary Examiner* — Frank Duong
(74) *Attorney, Agent, or Firm* — WPAT, P.C

(57) ABSTRACT

The present invention discloses a signal transceiving apparatus having echo-canceling mechanism. A mixer circuit includes a Wheatstone bridge and a transformer winding circuit. The Wheatstone bridge includes another transformer winding circuit and a variable load and includes a first input terminal, a first output terminal, a second input terminal and a second output terminal located at each two neighboring arms in an order. A transmission circuit is coupled to the first input terminal and the second input terminal to perform signal transmission through the mixer circuit. A receiving circuit is coupled to the first output terminal and the second output terminal to perform signal receiving through the mixer circuit. A control circuit adjusts the impedance of the variable load when a residual echo noise amount does not satisfy a minimum echo noise amount condition, and stops to adjust the impedance when the residual echo noise amount satisfies the condition.

18 Claims, 3 Drawing Sheets

(58) Field of Classification Search
CPC . H04B 3/04; H04B 3/142; H04B 3/20; H04B 3/21; H04B 3/23; H04B 3/237; H04L 2012/5614
See application file for complete search history.

(56) References Cited

U.S. PATENT DOCUMENTS

| | | |
|---|---|---|
| 6,373,908 B2 | 4/2002 | Chan |
| 7,106,235 B1 | 9/2006 | Yen et al. |
| 7,327,298 B2 | 2/2008 | Zabroda |
| 7,457,386 B1 | 11/2008 | Phanse |
| 8,045,702 B2 * | 10/2011 | Lin .................. H04B 3/23 |
| | | 379/406.13 |
| 8,737,278 B1 | 5/2014 | Yang et al. |
| 8,861,687 B2 | 10/2014 | Li et al. |
| 9,312,912 B2 * | 4/2016 | Chen .................. H04B 3/20 |
| 9,419,779 B2 | 8/2016 | Pan et al. |
| 11,063,628 B2 * | 7/2021 | Huang ................ H04B 3/23 |
| 2014/0010356 A1 * | 1/2014 | Li .................. H04B 3/21 |
| | | 379/406.1 |

* cited by examiner

SIGNAL TRANSCEIVING APPARATUS AND METHOD HAVING ECHO-CANCELING MECHANISM

BACKGROUND OF THE INVENTION

1. Field of the Invention

The present invention relates to a signal transceiving apparatus and a signal transceiving method having echo-canceling mechanism.

2. Description of Related Art

Gigabit Ethernet is a full-duplex communication system that is able to transmit and receive a data amount of 1 Gigabit/second (Gbps) simultaneously through four pairs of Ethernet wires, wherein each pair of Ethernet wires can transmit and receive a data amount of 0.25 Gbps. As a result, the full-duplex communication system can perform signal transmission and signal receiving simultaneously on the same pair of transmission wire, such that the signal transmission and signal receiving can be integrated to be performed by a transceiver based on the characteristic of a mixer circuit. The data transmission bandwidth can be greatly increased.

However, a non-ideal characteristic of the mixer circuit causes the receiving signal from a remote end suffers from the echo interference caused by the near-end transmission signal, which is called the near-end echo noise. When the echo noise is severe, the signal-to-noise ratio at the receiving terminal drops due to the echo noise such that the signal distorted or an error occurs. The interference of the echo noise becomes even severe when a communication system spanning a longer distance.

SUMMARY OF THE INVENTION

In consideration of the problem of the prior art, an object of the present invention is to provide a signal transceiving apparatus and a signal transceiving method having efficient echo-canceling mechanism.

The present invention discloses a signal transceiving apparatus having echo-canceling mechanism that includes a mixer circuit, a transmission circuit, a receiving circuit and a control circuit. The mixer circuit includes a Wheatstone bridge that includes a first transformer winding circuit, and the mixer circuit further includes a second transformer winding circuit. The Wheatstone bridge includes the first transformer winding circuit disposed on two diagonal arms and a pair of variable loads disposed on other two diagonal arms. The Wheatstone bridge further includes a first input terminal, a first output terminal, a second input terminal and a second output terminal at each two of the neighboring arms that are arranged in either a clockwise direction or a counter-clockwise direction. The second transformer winding circuit is electrically coupled to an external connection device through a pair of wires. The transmission circuit is electrically coupled to the first input terminal and the second input terminal to perform signal transmission through the mixer circuit. The receiving circuit is coupled to the first output terminal and the second output terminal to perform signal receiving through the mixer circuit. The control circuit is configured to calculate a residual echo noise amount when the receiving circuit performs signal receiving, determine whether the residual echo noise amount satisfies a minimum echo noise amount condition, adjusts the impedances of the variable loads when the residual echo noise amount does not satisfy the minimum echo noise amount condition and stop to adjust the impedances when the residual echo noise amount satisfies the minimum echo noise amount condition.

The present invention also discloses a signal transceiving method having echo-canceling mechanism that includes steps outlined below. Signal transmission is performed by a transmission circuit through a mixer circuit, wherein the mixer circuit includes a Wheatstone bridge having a first transformer winding circuit, and the mixer circuit further includes a second transformer winding circuit, the Wheatstone bridge includes the first transformer winding circuit disposed on two diagonal arms and a pair of variable loads disposed on other two diagonal arms, and further includes a first input terminal, a first output terminal, a second input terminal and a second output terminal at each two of the neighboring arms that are arranged in either a clockwise direction or a counter-clockwise direction, in which the second transformer winding circuit is electrically coupled to an external connection device through a pair of wires and the transmission circuit is electrically coupled the first input terminal and the second input terminal. Signal receiving is performed by a receiving circuit through the mixer circuit, wherein the receiving circuit is electrically coupled to the first output terminal and the second output terminal. A residual echo noise amount is calculated by a control circuit when the receiving circuit performs signal receiving. Whether the residual echo noise amount satisfies a minimum echo noise amount condition is determined by the control circuit. The impedance of the variable loads is adjusted when the residual echo noise amount does not satisfy the minimum echo noise amount condition and the impedance is stopped to be adjusted when the residual echo noise amount satisfies the minimum echo noise amount condition by the control circuit.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a signal transceiving apparatus and a signal transceiving method having echo-canceling mechanism to dispose variable loads having adaptive adjusting mechanism by using a Wheatstone bridge such that a residual echo noise amount on a receiving circuit is greatly reduced without affecting signal transmission and signal receiving.

Figure 1:
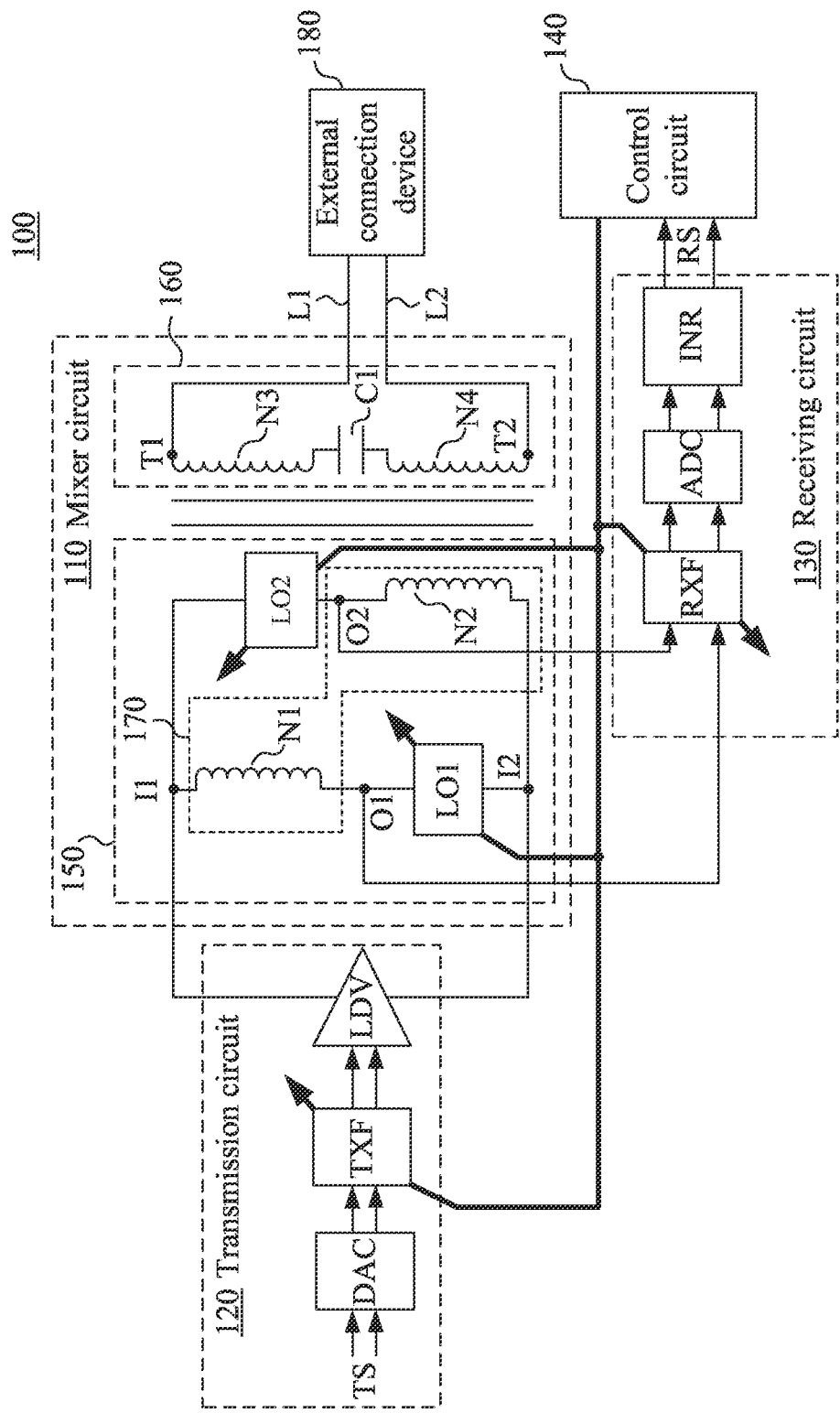
FIG. 1 illustrates a block diagram of a signal transceiving apparatus having echo-canceling mechanism according to an embodiment of the present invention.

Reference is now made to FIG. 1. FIG. 1 illustrates a block diagram of a signal transceiving apparatus 100 having echo-canceling mechanism according to an embodiment of the present invention. The signal transceiving apparatus 100 is configured to perform signal transmission and signal receiving with an external connection device 180 through a pair of wires L1 and L2 (e.g., transmission wires).

In an embodiment, the signal transceiving apparatus 100 is used in a Gigabit Ethernet configuration. Gigabit Ethernet is a full-duplex communication system that uses four pairs of Ethernet wires to perform signal communication. The pair of wires L1 and L2 are one of the four pairs of Ethernet wires. The signal transceiving apparatus 100 corresponds to the wires L1 and L2 and is able to perform signal transmission and signal receiving simultaneously.

The signal transceiving apparatus 100 includes a mixer circuit 110, a transmission circuit 120, a receiving circuit 130 and a control circuit 140.

The mixer circuit 110 includes a Wheatstone bridge 150 and a transformer winding circuit 160. The Wheatstone bridge 150 includes a transformer winding circuit 170 disposed on two diagonal arms and a pair of variable loads LO1 and LO2 disposed on other two diagonal arms. Further, the Wheatstone bridge 150 further includes a first input terminal I1, a first output terminal O1, a second input terminal I2 and a second output terminal O2 at each two of the neighboring arms. In the present embodiment, the first input terminal I1, the first output terminal O1, the second input terminal I2 and the second output terminal O2 are at each two of the neighboring arms and arranged in a counter-clockwise direction. In other embodiments, the first input terminal I1, the first output terminal O1, the second input terminal I2 and the second output terminal O2 may be at each two of the neighboring arms and arranged in a clockwise direction.

More specifically, the transformer winding circuit 170 includes a first winding N1 and a second winding N2. The first winding N1 is electrically coupled between the first input terminal I1 and the first output terminal O1. The second winding N2 is electrically coupled between the second output terminal O2 and the second input terminal I2. The first variable loads LO1 of the two variable loads LO1 and LO2 is electrically coupled between the first output terminal O1 and the second input terminal I2, and the second variable loads LO2 is electrically coupled between the first input terminal I1 and the second output terminal O2.

The transformer winding circuit 160 is electrically coupled to the external connection device 180 through the wires L1 and L2. In an embodiment, the transformer winding circuit 160 includes a third winding N3 and a fourth winding N4 electrically coupled between the first terminal T1 and the second terminal T2 in parallel. The capacitor C1 is electrically coupled between the third winding N3 and the fourth winding N4 in series. The first terminal T1 and the second terminal T2 are electrically coupled to external connection device 180 respectively through the wires L1, L2.

The transmission circuit 120 is electrically coupled to the first input terminal I1 and the second input terminal I2 to perform signal transmission through the mixer circuit 110.

In an embodiment, the transmission circuit 120 includes a digital to analog conversion circuit DAC, a transmission filter TXF and a line driving circuit LDV. When the transmission circuit 120 performs signal transmission with the external connection device 180, the transmission circuit 120 receives a transmission signal TS to be transmitted such that the digital to analog conversion circuit DAC performs digital to analog conversion thereon, the transmission filter TXF performs filtering thereon and the line driving circuit LDV performs signal enhancing thereon. Further, the transmission signal TS is further fed to the first winding N1 and the second winding N2 of the transformer winding circuit 170 through the first input terminal I1 and the second input terminal I2 respectively, coupled to the third winding N3 and the fourth winding N4 of the transformer winding circuit 160 and transmitted to the external connection device 180 through the wires L1 and L2.

It is appreciated that the circuit modules included in the transmission circuit 120 described above are merely an example. In different embodiments, the transmission circuit 120 may include different circuit modules depending on practical requirements. The present invention is not limited thereto.

The receiving circuit 130 is electrically coupled to the first output terminal O1 and the second output terminal O2 to perform signal receiving through the mixer circuit 110.

In an embodiment, the receiving circuit 130 includes a receiving filter RXF, an analog to digital conversion circuit ADC and an internal receiving circuit INR. When the receiving circuit 130 receives a signal from the external connection device 180, the signal that the external connection device 180 transmits is transmitted to the third winding N3 and the fourth winding N4 of the transformer winding circuit 160 through the wires L1 and L2 and coupled to the first winding N1 and the second winding N2 of the transformer winding circuit 170. The signal is further received by the receiving filter RXF through the first output terminal O1 and the second output terminal O2 such that the receiving filter RXF performs filtering thereon, the analog to digital conversion circuit ADC performs analog to digital conversion thereon and the internal receiving circuit INR performs post-processing thereon to generate a receiving signal RS.

It is appreciated that the circuit modules included in the receiving circuit 130 described above are merely an example. In different embodiments, the receiving circuit 130 may include different circuit modules depending on practical requirements. The present invention is not limited thereto.

The control circuit 140 is configured to determine whether the residual echo noise amount satisfies a minimum echo noise amount condition. When the residual echo noise amount does not satisfy the minimum echo noise amount condition, the control circuit 140 adjusts the impedance of the variable loads LO1 and LO2 to decrease the amount of leakage signal, that is called the near-end echo noise, of the transmission signal TS transmitted by the transmission circuit 120 on the receiving circuit 130 through the mixer circuit 110.

In an embodiment, between the pairs of arms of the Wheatstone bridge 150, when a ratio between the impedance of the variable load LO1 and the first winding N1 is equivalent to a ratio between the impedance of the second winding N2 and the variable load LO2, a component of the transmission signal TS that the receiving circuit 130 receives (i.e., the echo noise amount) is close to 0. However, since the winding circuit of the transformer is not idea and the load observed from the transmission terminal becomes different and variant due to the material and the length of the transmission line (i.e., wire), the echo noise is not able to be fully suppressed. Nevertheless, the residual echo noise amount can still be further reduced through the use of the adaptively variable loads LO1 and LO2 on the plenty of connection conditions.

In an embodiment, when the control circuit 140 is configured to determine the amount of the residual echo noise, the external connection device 180 does not transmit signal to the signal transceiving apparatus 100. Under such a condition, the transmission circuit 120 performs signal transmission through the mixer circuit 110. The receiving circuit 130 performs signal receiving through the mixer circuit 110. The receiving signal RS received by the receiving circuit 130 only includes the residual echo noise amount, which is the component of the signal transmitted by the transmission circuit 120 that is leaked through the mixer circuit 110. The receiving circuit 130 receives the residual echo noise and the control circuit 140 performs residual echo noise calculation.

When the residual echo noise amount does not satisfy the minimum echo noise amount condition, the control circuit 140 selects one of a plurality of groups of pre-stored impedances according to the residual echo noise amount to set the group of impedances of the variable loads LO1 and LO2 adaptively. In an embodiment, the pre-stored impedances can be stored in a storage circuit (not illustrated in the figure) further included in the signal transceiving apparatus 100 and accessed by the control circuit 140.

In different embodiments, the variable loads LO1 and LO2 may include different structures and components. In an embodiment, the variable load LO2 and the variable load LO1 have the same structure. As a result, only the variable load LO1 is used to be described as an example in the following paragraphs.

Figure 2A:
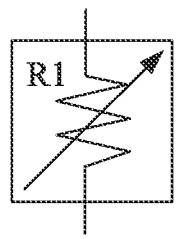
FIG. 2A to FIG. 2C respectively illustrates a circuit diagram of the variable load according to an embodiment of the present invention.
Figure 2B:
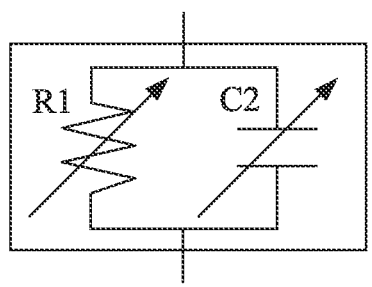
Figure 2C:
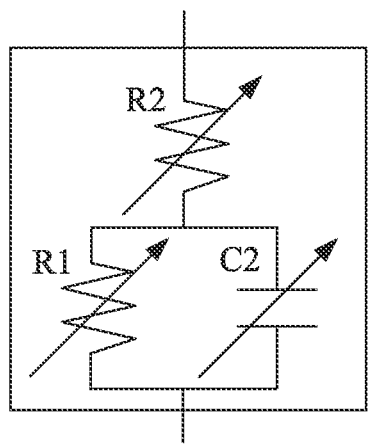

Reference is now made to FIG. 2A to FIG. 2C. FIG. 2A to FIG. 2C respectively illustrates a circuit diagram of the variable load LO1 according to an embodiment of the present invention Depending on different requirements, the variable load LO1 can be a variable resistor circuit having at least one variable resistor R1 illustrated in FIG. 2A, or a variable resistor and capacitor circuit illustrated in FIG. 2B and FIG. 2C. The variable resistor and capacitor circuit in FIG. 2B includes a variable resistor R1 and a variable capacitor C2 electrically coupled in parallel. The variable resistor and capacitor circuit in FIG. 2C includes a circuit that includes the variable resistor R1 and the variable capacitor C2 electrically coupled in parallel, and a variable resistor R2 electrically coupled to the circuit in series.

As a result, each of the groups of pre-stored impedances may include at least a resistance, at least a capacitance or a combination thereof based on the different structures of the variable loads described above, and can be applied to the variable load LO1 and the variable load LO2 after being selected by the control circuit 140. It is appreciated that the structure of the variable load described above is merely an example. In other embodiments, the variable load may include other structures or further include other components, e.g., an inductor. The present invention is not limited thereto.

In an embodiment, when the residual echo noise amount has a minimum value under the condition that the variable loads LO1 and LO2 is set to have one of the pre-stored impedances, the control circuit 140 determines that the residual echo noise amount satisfies the minimum echo noise amount condition. In another embodiment, when the residual echo noise amount is lower than a threshold value under the condition that the variable loads LO1 and LO2 is set to have one of the pre-stored impedances, the control circuit 140 determines that the residual echo noise amount satisfies the minimum echo noise amount condition.

When the residual echo noise amount satisfies the minimum echo noise amount condition, the control circuit 140 stops to adjust the impedances of the variable loads LO1 and LO2. Under such a condition, the transmission circuit 120 and the receiving circuit 130 are able to perform signal transmission and signal receiving with the external connection device 180 through the mixer circuit 110.

As a result, the signal transceiving apparatus disposes the variable loads having adaptive adjusting mechanism by using the Wheatstone bridge such that the residual echo noise amount on the receiving circuit is greatly reduced without affecting signal transmission and signal receiving.

In an embodiment, besides the non-ideal characteristic of the first winding N1 and the second winding N2, the length and the form of the wires L1 and L2 may also influence the impedance matching to further influence the residual echo noise amount. As a result, the control circuit 140 may adjust at least one group of filter parameters of the transmission filter TXF included in the transmission circuit 120 and the receiving filter RXF of the receiving circuit 130 according to the estimated length of the wires L1 and L2.

In an embodiment, the control circuit 140 is configured to receive a signal from the external connection device 180 by using the receiving circuit 140 through the mixer circuit 110 to determine a wire length of the wires L1 and L2 according to the signal. In an embodiment, the control circuit 140 determines the wire length of the wires L1 and L2 according to the signal strength of the receiving signal on a specific frequency.

For example, for Gigabit Ethernet having a 62.5 MHz bandwidth, the control circuit 140 can calculate a ratio between the signal strengths of the receiving signal RS at frequencies of such as, but not limited to 10 MHz and 30 MHz. When the ratio is close to 1, the control circuit 140 determines that under such a condition, the wire length is, e.g., 1 meter. When the signal strength at the higher frequency, i.e., 30 MHz, drops dramatically and the signal strength at the lower frequency, i.e., 10 MHz, drops slightly, the control circuit 140 determines that under such a condition, the wire length is longer, e.g., 100 meters.

It is appreciated that the method to determine the wire length and the related values of the wire length described above are merely an example. In other embodiments, the control circuit 140 may determine the wire length by using other methods or perform determination according to different values based on actual conditions.

In an embodiment, the control circuit 140 selects one of a plurality of groups of pre-stored filter parameters to set the group of filter parameters of the transmission filter TXF and the receiving filter RXF. In an embodiment, the pre-stored filter parameters can be stored in a storage circuit (not illustrated in the figure) further included in the signal transceiving apparatus 100 and accessed by the control circuit 140.

In an embodiment, when the wire length is longer, the control circuit 140 shrinks the bandwidths of the transmission filter TXF and the receiving filter RXF, to prevent the receiving circuit 130 from receiving too much echo noise under the condition that the wires are longer.

As a result, the signal transceiving apparatus of the present invention further decreases the influence of the wire length on the residual echo noise amount by adjusting the filter parameters of the transmission filter of the transmission circuit and the receiving filter of the receiving circuit.

In practical application, the control circuit 140 may operate the variable loads LO1 and LO2 with a default group of impedances, and operate the transmission filter TXF and the receiving filter RXF with a default group of filter parameters to initialize the adjusting mechanism. The control circuit 140 first estimates the wire length in the system under such a condition and sets the filter parameters of the transmission filter TXF and the receiving filter RXF according to the estimated wire length. Subsequently, the control circuit 140 calculates the residual echo noise amount and adjusts the impedances of the variable loads LO1 and LO2. When the residual echo noise amount satisfies the minimum echo noise amount condition, the control circuit 140 stops to adjust the impedances of the variable loads LO1 and LO2, and controls the transmission circuit 120 and the receiving circuit 130 to begin to perform signal transmission and signal receiving with the external connection device 180 through the mixer circuit 110. The signal transceiving apparatus 100 can greatly reduce the residual echo noise amount according to the process described above, and prevent the receiving circuit 130 from being interfered by the echo noise from the transmission circuit 120.

It is appreciated that the order of adjusting described above is merely an example. The present invention is not limited thereto.

Figure 3:
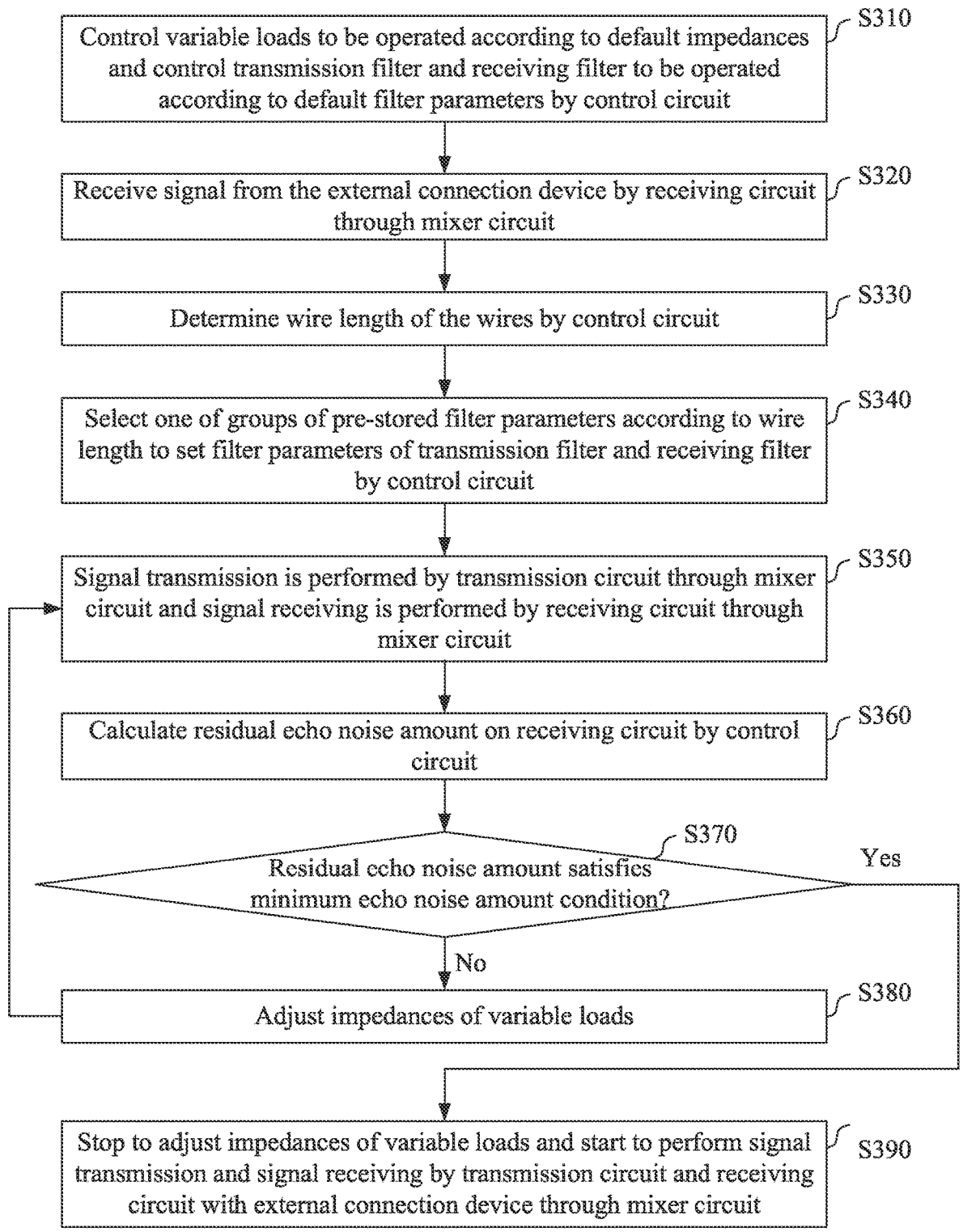
FIG. 3 illustrates a flow chart of a signal transceiving method having echo-canceling mechanism according to an embodiment of the present invention.

Reference is now made to FIG. 3. FIG. 3 illustrates a flow chart of a signal transceiving method 300 having echo-canceling mechanism according to an embodiment of the present invention.

Besides the apparatus described above, the present invention further discloses the memory sharing method 300 that can be used in such as, but not limited to the signal transceiving apparatus 100 illustrated in FIG. 1. An embodiment of the signal transceiving method 300 is illustrated in FIG. 3 and includes the steps outlined below.

In step S310, the variable loads LO1 and LO2 are controlled to be operated according to default impedances and the transmission filter TXF and the receiving filter RXF are controlled to be operated according to default filter parameters by the control circuit 140.

In step S320, a signal from the external connection device 180 is received by the receiving circuit 130 through the mixer circuit 110.

In step S330, the wire length of the wires L1 and L2 is determined by the control circuit 140.

In step S340, one of a plurality of groups of pre-stored filter parameters is selected according to the wire length to set the filter parameters of the transmission filter TXF and the receiving filter RXF by the control circuit 140.

In step S350, signal transmission is performed by the transmission circuit 120 through the mixer circuit 110 and signal receiving is performed by the receiving circuit 130 through the mixer circuit 110. In an embodiment, the external connection device 180 does not transmit signal to the signal transceiving apparatus 100 such that the receiving signal RS received by the receiving circuit 130 only includes the residual echo noise amount.

In step S360, the residual echo noise amount on the receiving circuit 130 is calculated by the control circuit 140.

In step S370, whether the residual echo noise amount satisfies the minimum echo noise amount condition is determined by the control circuit 140.

In step S380, when the residual echo noise amount does not satisfy the minimum echo noise amount condition, the impedances of the variable loads LO1 and LO2 are adjusted by the control circuit 140. The flow goes back to step S350 to perform signal transmission and receiving again and perform calculation and determination of the residual echo noise amount.

In step S390, when the residual echo noise amount satisfies the minimum echo noise amount condition, the impedance of the variable loads LO1 and LO2 are stopped to be adjusted by the control circuit 140. Signal transmission and signal receiving are started to be performed by the transmission circuit 120 and the receiving circuit 130 with the external connection device 180 through the mixer circuit 110.

It is appreciated that the embodiments described above are merely an example. In other embodiments, it should be appreciated that many modifications and changes may be made by those of ordinary skill in the art without departing, from the spirit of the invention.

In summary, the signal transceiving apparatus and the signal transceiving method having echo-canceling mechanism of the present invention dispose variable loads having adaptively adjusting mechanism by using a Wheatstone bridge such that a residual echo noise amount on a receiving circuit in the full-duplex communication system is greatly reduced.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A signal transceiving apparatus having echo-canceling mechanism, comprising:
   a mixer circuit comprising:
      a Wheatstone bridge comprising a first transformer winding circuit disposed on two diagonal arms and a pair of variable loads disposed on other two diagonal arms, and further comprising a first input terminal, a first output terminal, a second input terminal and a second output terminal at each two of the neighboring arms that are arranged in either a clockwise direction or a counter-clockwise direction; and
      a second transformer winding circuit electrically coupled to an external connection device through a pair of wires;
   a transmission circuit electrically coupled to the first input terminal and the second input terminal to perform signal transmission through the mixer circuit;
   a receiving circuit is coupled to the first output terminal and the second output terminal to perform signal receiving through the mixer circuit; and
   a control circuit configured to calculate a residual echo noise amount when the receiving circuit performs signal receiving, determine whether the residual echo noise amount satisfies a minimum echo noise amount condition, adjust the impedances of the variable loads when the residual echo noise amount does not satisfy the minimum echo noise amount condition and stop to adjust the impedances when the residual echo noise amount satisfies the minimum echo noise amount condition.

2. The signal transceiving apparatus of claim 1, wherein the first transformer winding circuit comprises a first winding and a second winding, the first winding is electrically coupled between the first input terminal and the second output terminal, and the second winding is electrically coupled between the first output terminal and the second input terminal;
   wherein the pair of variable loads comprises a first variable load and a second variable load, the first variable load is electrically coupled between the second output terminal and the second input terminal, and the second variable load is electrically coupled between the first input terminal and the first output terminal.

3. The signal transceiving apparatus of claim 1, wherein the second transformer winding circuit comprises a third winding and a fourth winding electrically coupled between a first terminal and a second terminal in parallel, and the first terminal and the second terminal are electrically coupled to the external connection device through the wires.

4. The signal transceiving apparatus of claim 1, wherein the transmission circuit comprises a transmission filter and the receiving circuit comprises a receiving filter, the control circuit is further configured to receive a signal from the external connection device by using the receiving circuit through the mixer circuit to determine a wire length of the wire according to the signal, so as to set a group of filter parameters of the transmission filter and the receiving filter according to the wire length.

5. The signal transceiving apparatus of claim 4, wherein the control circuit selects one of a plurality of groups of pre-stored filter parameters to set the group of filter parameters of the transmission filter and the receiving filter.

6. The signal transceiving apparatus of claim 1, wherein the pair of the variable loads is a pair of variable resistor circuits or a pair of variable resistor and capacitor circuits.

7. The signal transceiving apparatus of claim 1, wherein the control circuit selects one of a plurality of groups of pre-stored impedances according to the residual echo noise amount to set the group of impedances of the variable loads.

8. The signal transceiving apparatus of claim 7, wherein when the residual echo noise amount has a minimum value when the variable loads is set to have one of the pre-stored impedances, the control circuit determines that the residual echo noise amount satisfies the minimum echo noise amount condition.

9. The signal transceiving apparatus of claim 7, wherein when the residual echo noise amount is lower than a threshold value when the variable loads is set to have one of the pre-stored impedances, the control circuit determines that the residual echo noise amount satisfies the minimum echo noise amount condition.

10. A signal transceiving method having echo-canceling mechanism, comprising:
performing signal transmission by a transmission circuit through a mixer circuit, wherein the mixer circuit comprises a Wheatstone bridge having a first transformer winding circuit, and the mixer circuit further comprises a second transformer winding circuit, the Wheatstone bridge comprises the first transformer winding circuit disposed on two diagonal arms and a pair of variable loads disposed on other two diagonal arms, and further comprises a first input terminal, a first output terminal, a second input terminal and a second output terminal at each two of the neighboring arms that are arranged in either a clockwise direction or a counter-clockwise direction, in which the second transformer winding circuit is electrically coupled to an external connection device through a pair of wires and the transmission circuit is electrically coupled the first input terminal and the second input terminal;
performing signal receiving by a receiving circuit through the mixer circuit, wherein the receiving circuit is electrically coupled to the first output terminal and the second output terminal;
calculating a residual echo noise amount when the receiving circuit performs signal receiving by a control circuit;
determining whether the residual echo noise amount satisfies a minimum echo noise amount condition by the control circuit; and
adjusting the impedances of the variable loads when the residual echo noise amount does not satisfy the minimum echo noise amount condition and stopping to adjust the impedances when the residual echo noise amount satisfies the minimum echo noise amount condition by the control circuit.

11. The signal transceiving method of claim 10, wherein the first transformer winding circuit comprises a first winding and a second winding, the first winding is electrically coupled between the first input terminal and the second output terminal, and the second winding is electrically coupled between the first output terminal and the second input terminal;
wherein the pair of variable loads comprises a first variable load and a second variable load, the first variable load is electrically coupled between the second output terminal and the second input terminal, and the second variable load is electrically coupled between the first input terminal and the first output terminal.

12. The signal transceiving method of claim 10, wherein the second transformer winding circuit comprises a third winding and a fourth winding electrically coupled between a first terminal and a second terminal in parallel, and the first terminal and the second terminal are electrically coupled to the external connection device through the wires.

13. The signal transceiving method of claim 10, wherein the transmission circuit comprises a transmission filter and the receiving circuit comprises a receiving filter, the signal transceiving method further comprises:
receiving a signal from the external connection device by using the receiving circuit through the mixer circuit by the control circuit to determine a wire length of the wire according to the signal, so as to set a group of filter parameters of the transmission filter and the receiving filter according to the wire length.

14. The signal transceiving method of claim 13, further comprising:
selecting one of a plurality of groups of pre-stored filter parameters to set the group of filter parameters of the transmission filter and the receiving filter by the control circuit.

15. The signal transceiving method of claim 10, wherein the pair of the variable loads is a pair of variable resistor circuits or a pair of variable resistor and capacitor circuits.

16. The signal transceiving method of claim 10, further comprising:
selecting one of a plurality of groups of pre-stored impedances according to the residual echo noise amount to set the group of impedances of the variable loads by the control circuit.

17. The signal transceiving method of claim 16, further comprising:
determining that the residual echo noise amount satisfies the minimum echo noise amount condition by the control circuit when the residual echo noise amount has a minimum value when the variable loads is set to have one of the pre-stored impedances.

18. The signal transceiving method of claim 16, further comprising:
determining that the residual echo noise amount satisfies the minimum echo noise amount condition by the control circuit when the residual echo noise amount is lower than a threshold value when the variable loads is set to have one of the pre-stored impedances.

* * * * *